(12) United States Patent
Reitan

(10) Patent No.: US 8,902,160 B2
(45) Date of Patent: Dec. 2, 2014

(54) REDUCING DISTORTION IN AN IMAGE SOURCE COMPRISING A PARALLAX BARRIER

(75) Inventor: Dan Reitan, Mountain View, CA (US)

(73) Assignee: ReinCloud Corporation, Mountain View, CA (US)

( * ) Notice: Subject to any disclaimer, the term of this patent is extended or adjusted under 35 U.S.C. 154(b) by 28 days.

(21) Appl. No.: 13/594,704

(22) Filed: Aug. 24, 2012

(65) Prior Publication Data

US 2014/0055340 A1   Feb. 27, 2014

(51) Int. Cl.
*G06F 3/01* (2006.01)

(52) U.S. Cl.
USPC .......................................... 345/156; 345/204

(58) Field of Classification Search
CPC ............. G06T 15/00; G09G 5/00; G09G 5/02
USPC ......................... 345/204, 208–210
See application file for complete search history.

(56) References Cited

U.S. PATENT DOCUMENTS

| | | | |
|---|---|---|---|
| 7,506,984 B2 | 3/2009 | Saishu et al. | |
| 7,843,449 B2 * | 11/2010 | Krah | 345/419 |
| 7,990,371 B2 * | 8/2011 | Bar-Zohar et al. | 345/204 |
| 8,502,826 B2 | 8/2013 | Adhikari et al. | |
| 2008/0218856 A1 | 9/2008 | Saishu et al. | |
| 2011/0080401 A1 * | 4/2011 | Tan et al. | 345/419 |
| 2011/0096073 A1 * | 4/2011 | Adhikari et al. | 345/426 |

FOREIGN PATENT DOCUMENTS

| | | |
|---|---|---|
| JP | 2001128195 A | 5/2001 |
| JP | 2007072269 A | 3/2007 |
| KR | 100677563 B1 | 2/2007 |
| KR | 1020070061091 A | 6/2007 |

OTHER PUBLICATIONS

"International Search Report and Written Opinion, International Application No. PCT/US2013/056259", Dec. 27, 2013, 10.

* cited by examiner

*Primary Examiner* — Andrew Sasinowski

(57) ABSTRACT

A method for reducing distortion from a stereoscopic image source comprising a parallax barrier layer is described. Embodiments include: capturing one or more audience images of at least one viewer with an image capturing device; determining, at a processor, locations of a plurality of eyes of the at least one viewer based on the audience images; determining incidental angles of the plurality of eyes; and selecting at least one distortion correction filter from a plurality of distortion correction filters based on the incidental angles of the plurality of eyes.

20 Claims, 3 Drawing Sheets

REDUCING DISTORTION IN AN IMAGE SOURCE COMPRISING A PARALLAX BARRIER

BACKGROUND

Three dimensional (3D) screens are increasingly popular. Having recently implemented stereoscopic support for devices such as smart phones, portable video consoles, and televisions, inherent limitations of the underlying technology have become evident.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

NOTATION AND NOMENCLATURE

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "capturing", "determining", "selecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

OVERVIEW OF DISCUSSION

Example techniques, devices, systems, and methods for reducing distortion from a stereoscopic image source comprising a parallax barrier layer are described herein. Discussion begins with a high level description of an image source comprising a parallax barrier. Example problems with image sources comprising parallax barriers are then described. Discussion continues with a description of example distortion correction filters. Example systems to determine which filter to select to correct distortion are then described. Next, determining which filter to use to correct distortion when there are a plurality of viewers is described. Example application programming interfaces are then discussed. Lastly, example methods of use are described.

High Level Description of an Image Source Comprising a Parallax Barrier

Figure 1A:
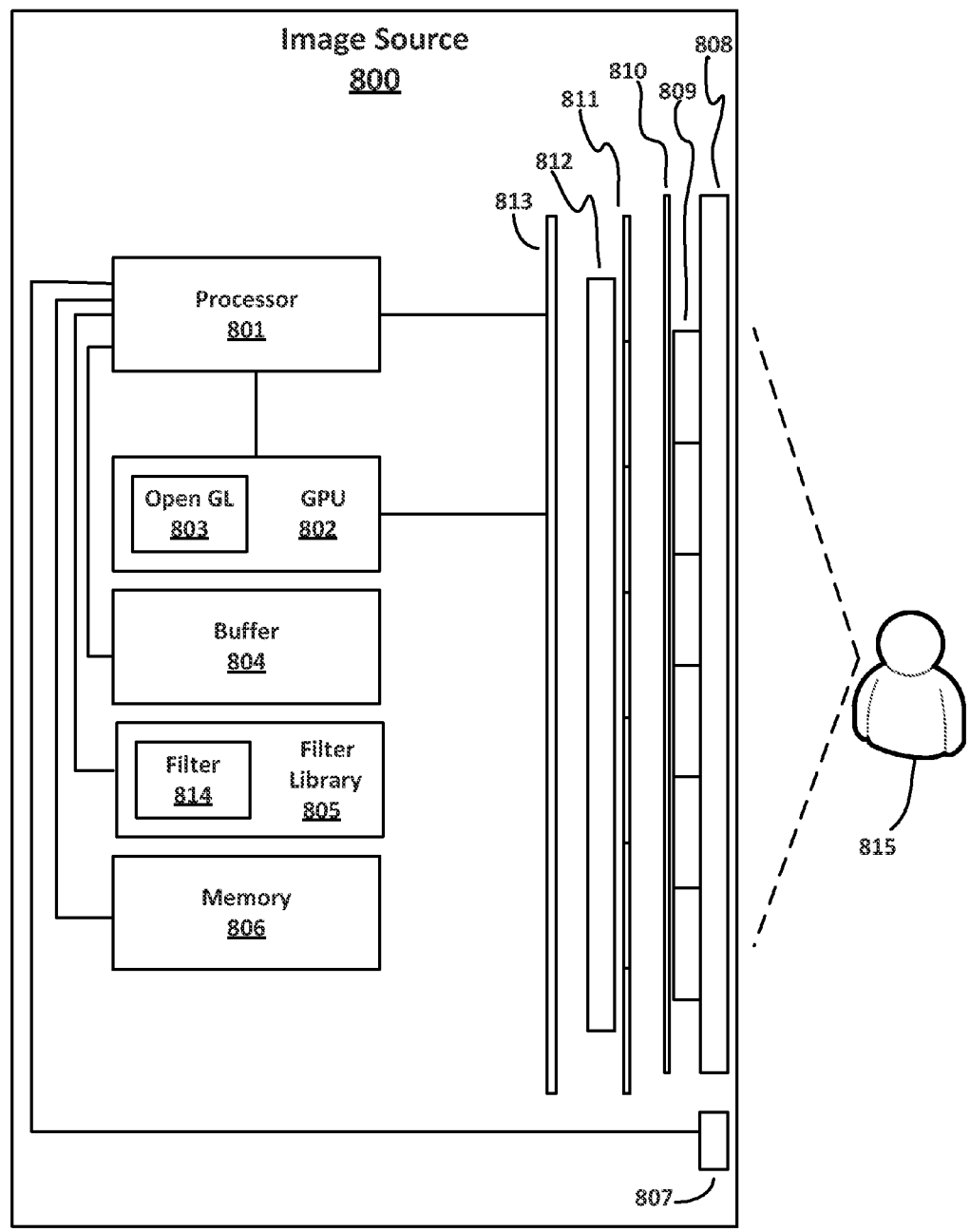
FIG. 1A is an example block diagram upon which embodiments of the present invention may be implemented, according to an embodiment.

FIG. 1A shows an example image source 800. Although example image source 800 shows a liquid crystal display, image source 800 does not need to be a liquid crystal display. Image source 800 is operable to produce various screen resolutions. For instance, in one embodiment image source 800 is operable to accept a 1080p signal and display it with a native resolution of at least 1080 lines (i.e., image source 800 comprises a 1080p display), while in other embodiments image source 800 could comprise a 4080p display, etc.

Example image source 800 comprises processor 801. Example image source 800 also comprises a GPU 802 that, in some embodiments, employs an OpenGL (e.g., OpenGL ES) interface 803. In some embodiments image source 800 also comprises buffer 804, a filter library 805 that comprises filters 814, an example memory 806, image capturing device 807, front glass/surface 808, polarizer 809, color filter 810, parallax barrier 811, liquid crystals 812, and light source 813. In an embodiment, various components of image source 800 are communicatively coupled. Note that the images in the figures are not drawn to scale.

Liquid crystal displays are known in the art. Thus, a detailed discussion about the operation of a generic liquid crystal display will be omitted for the sake of clarity and brevity.

Figure 1B:
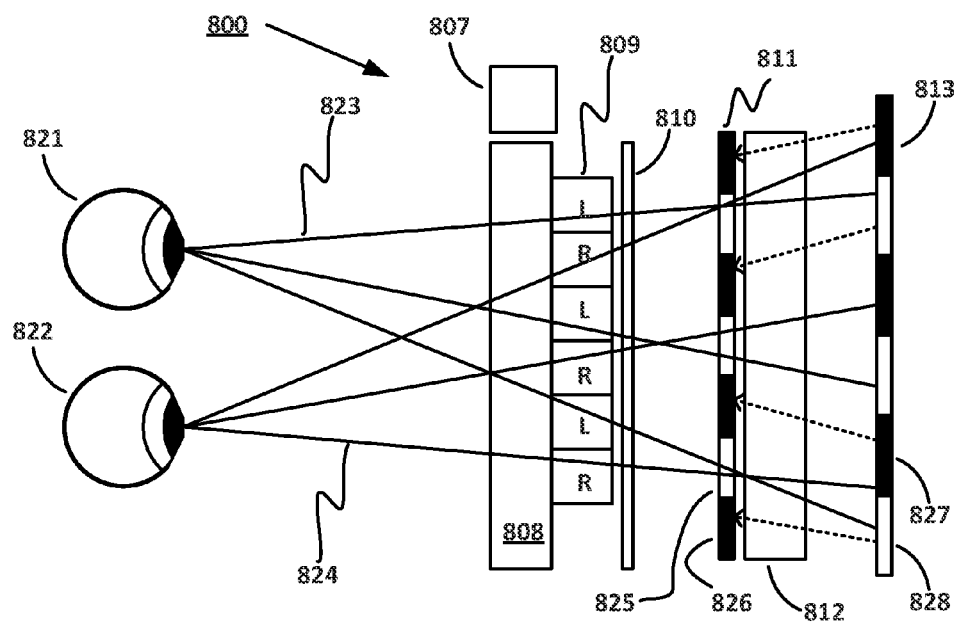
FIG. 1B is an example system upon which embodiments of the present invention may be implemented, according to an embodiment.

FIG. 1B shows a pair of eyes viewing image source 800. A parallax barrier 811 allows an image source 800 to show a stereoscopic image without the need for a viewer 815 (of FIG. 1B) to wear three dimensional (3D) glasses. In an embodiment image source 800 is a liquid crystal display comprising a parallax barrier 811. Parallax barrier 811 comprises slits 825, allowing each eye 821 and 822 to see a different display image 827 and 828 (i.e., images are mapped stereoscopically), creating a sense of depth. In one embodiment, parallax barrier 811 is located between liquid crystals 812 and light source 813. In some embodiments, liquid crystals 812 are located between parallax barrier 811 and light source 813.

In an embodiment, image source 800 comprises a buffer 804 to store images rendered for a left eye 828 and images rendered for a right eye 827 to create a stereoscopic display image. Images as used herein include, but are not limited to: still images, video, etc. In one embodiment, rendering images occurs when a processor 801 receives an asynchronous render call. In one embodiment, the buffer (or buffers) 804 is filled and then blended, as will be discussed in further detail below. Note that a buffer 804 can be internal or external to a processor 801. In one embodiment, buffer 804 is located in memory

806. In various embodiments, rendering is performed by a GPU 802, CPU 801, or a combination of GPU 802 and CPU 801. Note that in some embodiments, processor 801 may be a type of processor other than a CPU.

Example Problems with Image Sources Comprising Parallax Barriers

Figure 1C:
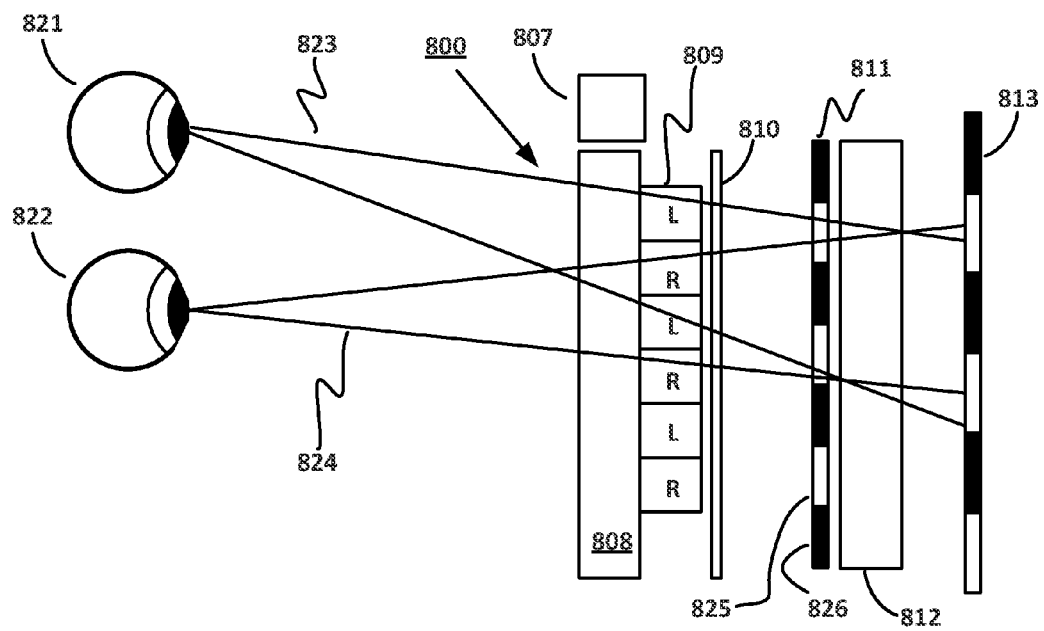
FIG. 1C is an example system upon which embodiments of the present invention may be implemented, according to an embodiment.

FIG. 1C shows an example disadvantage of an image source 800 that creates the illusion of 3D using a parallax barrier. If the eyes 821 and 822 of a viewer 815 are not positioned at a particular location, the viewer 815 may not experience the 3D effect because the right eye 822 may receive, in part, pixels intended for receipt by the left eye 821.

For example, eye 821 and 822 may receive partial pixels intended for the other eye 821 and 822 when a viewer 815 holds a portable image source 800 at far distance, or too far to the left or the right. This may cause a viewer 815 to see a pixel by pixel variating mixture of two images, which can be disorienting. Also, this effect may occur when more than one viewer 815 attempts to view image source 800. The effect seen by the viewer 815 can be a Moire pattern that animates across the screen. In some instances the disorienting effect can cause a headache.

In FIG. 1B, eyes 821 and 822 are at a different angle then the eyes 821 and 822 in FIG. 1C. When eyes 821 and 822 are in a particular location, such as in FIG. 1B, the left eye's line of sight 823 goes through polarizer 809 and color filter 810, through the slits 825 in the parallax barrier 811, and reaches the light source 813 operable to project light intended for the left eye 828. Similarly, the line of right eyes' sight 824 receives light intended for the right eye 827 through slits 825. While the slits 825 in the parallax barrier allow light intended for the right eye 827 to reach the right eye 822, the blocking portions 826 of the parallax barrier 811 prevent light intended for the right eye 827 to reach the left eye 821. Similarly, the blocking portions 826 of the parallax barrier 811 prevent light intended for the left eye 828 from reaching the right eye 822.

However, as shown in FIG. 1C, a fixed parallax barrier 811 can only approximate the pattern required to create a perfect mask. A perfect mask would only allow light meant for the left eye 828 to reach the left eye 821, and only allow light meant for the right eye 827 to reach the right eye 822. Quantization errors based on the geometry of the viewing angles creates distortion. The ideal angle of incidence generally requires a perfectly perpendicular angle between the viewing glass 808 and eyes 821 and 822, and a particular distance between eyes 821 and 822 and the viewing glass 808. In other words, in an embodiment a perfect mask only works correctly (i.e., does not produce distortion) when a viewer is 815 is positioned correctly.

Example Distortion Correction Filters

Basically, to fix the problem described above, in an embodiment, image source 800 determines where eyes 821 and 822 are located relative to a component of image source 800, and pre-distorts an image using a distortion correction filter 814. The filter 814 is also known as error map 814 or maps of error predictions 814. Filter 814 is operable to prevent light intended for one eye 821 and 822 to reach the wrong eye 821 and 822. In one embodiment, a filter 814 is blended with a rendered image to pre-distort the rendered image. Thus, anticipated distortion based on the locations of eyes 821 and 822 is prevented. In various embodiments, these operations are performed concurrently, in real-time, and/or near real-time.

In an embodiment, image source 800 uses a distortion correction filter 814, which is a type of anti-aliasing filter, to correct distortion (e.g., quantization errors). Quantization errors can be derived trigonometrically given the incidental angles of eyes 821 and 822.

In an embodiment, filters 814 are developed based upon a trigonometric transfer function with interactive derivation of additional coefficients through observation. In one embodiment an automated optical pattern recognition system is employed.

These filters 814 can be monochromatic stereoscopic images, as the filters 814 are expressed as full pixel arrays of scalar distortion levels related to each eye 821 and 822. These filters 814 change with respect to the distance and incidental angle of a component of image source 800. A component of image source 800 includes, but is not limited to: glass surface 808, image capturing device 807, etc. Note that glass/display surface 808 does not need to comprise glass; the surface 808 may comprise a material other than glass.

Example Systems to Determine which Filter to Select to Correct Distortion

In an embodiment, image capturing device 807 takes a picture of a viewer 815 or viewers 815, also referred to as an audience image, and software libraries are used to identify the location of the facial features of a viewer(s) 815. In an embodiment, image capturing device 807 is a camera. In an embodiment, the location of the eyes 821 and 822 are located based on an audience image (not shown). In an embodiment, the angular position of the eyes 821 and 822 relative to a component of image source 800 is determined. Components of an image source 800 include, but are not limited to: image capturing device 807, display surface 808, parallax barrier 811, light source 813, etc. In an embodiment, the distance between eyes 821 and 822 and a component associated with image source 800 is determined by triangulation using a plurality of image capturing devices 807 or other means, to assist with determining a location of eyeballs 821 and 822. In one embodiment, a display picture element layer includes, but is not limited to: display surface 808, light source 813, polarizer 809, liquid crystals 812, etc.

Image capturing device 807 may be located in various positions. In some embodiments, image capturing device 807 is on a plane with surface glass 808. In some embodiments, image capturing device 807 is remote from image source 800. In some embodiments, image capturing device 807 is comprised within image source 800. In one embodiment, image capturing device 807 is disposed behind surface glass 808. In some embodiments, image capturing device 807 may capture, and image source 800 may process, between 30 and 50 images or more per second.

In an embodiment, the incidental angles of the light rays 823 and 824 between eyes and a component of image source 800 are derived from an audience image and can be used as an index to find the filter 814 that prevents the most quantization errors seen by a viewer 815 out of the filter library 805. Note that in an embodiment, filter 814 is one of a plurality of filters 814 that may be located in filter library 805.

In an embodiment, a blend function is used to integrate filter 814 with the display images 827 and 828. In one embodiment, filter 814 overlays display images 827 and 828 such that one eye 821 and 822 doesn't receive light 827 and 828 intended for the other eye 821 and 822. In one embodiment, blending the display images (e.g., bitmaps) may occur and then the blended images may be re-routed to the same memory 806 containing the original graphic buffers 804.

In an embodiment, a subset of the plurality of the distortion correction filters 814 are selected and interpolated based on the angles of the eyes 821 and 822. For example, when eyes 821 and 822 are at a particular location where a combination of filters 814 would create the best 3D image for a viewer 815, a plurality of filters 814 are interpolated to create a more precise filter 814. In an embodiment, the interpolation between a plurality of filters 814 is linear. In another embodiment, interpolation between a plurality of filters is non-linear. In an embodiment, interpolation is based on a transfer function. In one embodiment, the transfer function is based on determining incidental angles of eyes 821 and 822 and finding an average mean square of the angles and/or the location of the eyes.

Determining which Filter to Use to Correct Distortion when there are a Plurality of Viewers In an embodiment, image capturing device 807 is operable to determine that there are multiple viewers 815. For instance, using facial recognition software processor 801 may determine that there are more than 2 eyes 821 and 822 in an audience image. In such a case, image capturing device 807 is operable to capture the locations and/or incidental angles of all eyes 821 and 822. In an embodiment, a filter 814 or combination of filters 814 is chosen to optimize the reduction of distortion for the group of viewers 815. In one embodiment, this method of choosing a filter 814 when there are multiple viewers 815 is performed by determining incidental angles of eyes 821 and 822 and finding an average root mean square of the angles and/or the locations of the eyes 821 and 822.

Example Application Programming Interfaces

In some embodiments, application programming interfaces (APIs) are used by image source 800. In one embodiment, GPU 802 uses Open Graphics Library (OpenGL) 803 as an interface for rendering images as discussed herein (e.g., OpenGL ES). In one embodiment, an interface that comprises a higher-level of abstraction than an OpenGL interface 803 and rests upon an OpenGL interface 803 is employed to render images. With this higher-level of abstraction software developers can reduce distortion.

Example Methods of Use

Figure 1D:
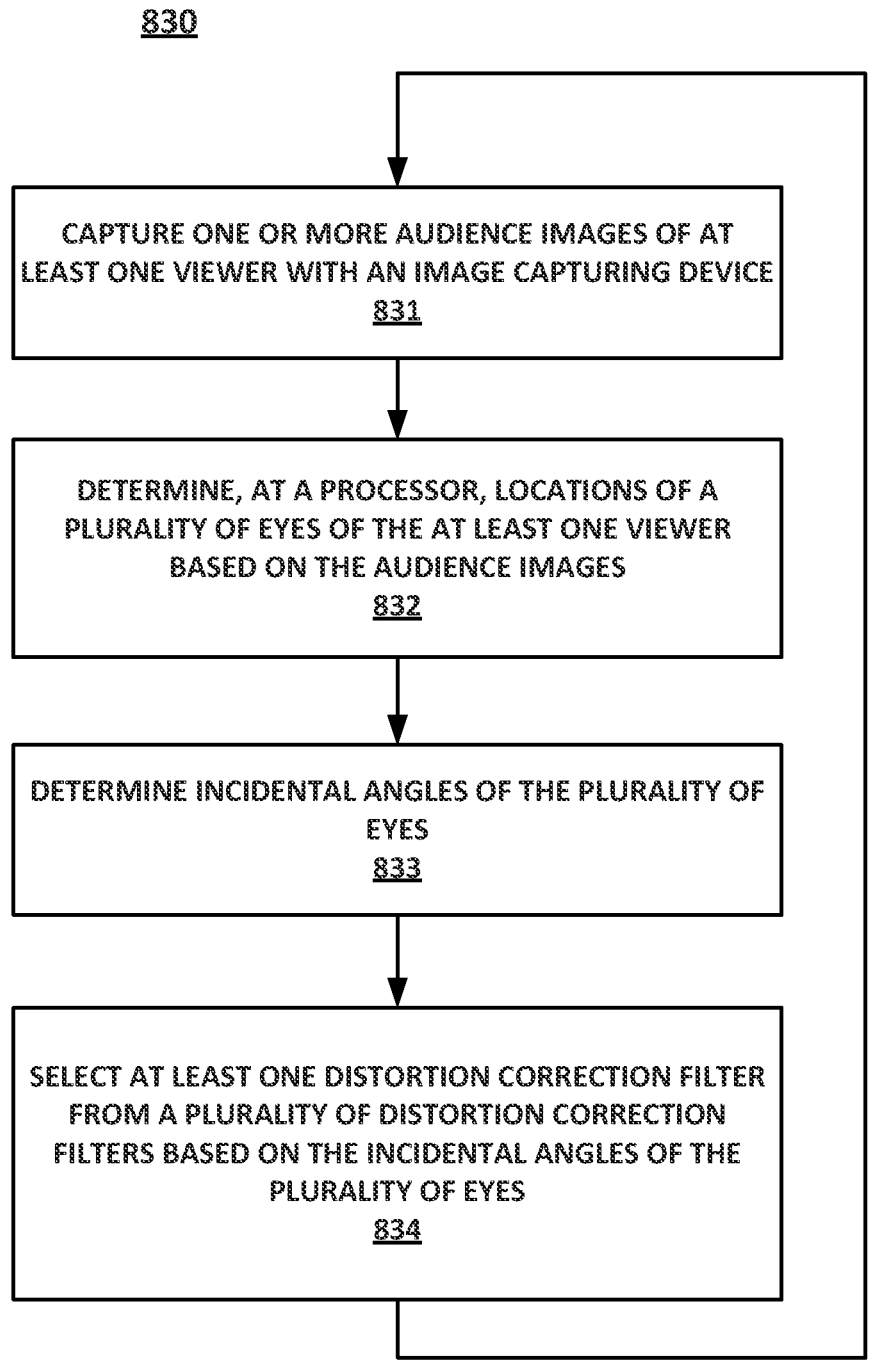
FIG. 1D is example flowchart for reducing distortion in an image source comprising a parallax barrier in accordance with embodiments of the present invention.

FIG. 1D is a flow diagram 830 of an example method of reducing distortion in an image source 800 comprising a parallax barrier 811.

In operation 831, in one embodiment, one or more audience images are captured of at least one viewer 815 with an image capturing device 807. In some embodiments audience images may be captured with more than one image capturing device 807. In an embodiment, an audience image assists to locate eyes 821 and 822 and assist with determining the incidental angles of eyes 821 and 822 relative to a component of image source 800.

In operation 832, in one embodiment, the locations of a plurality of eyes 821 and 822 of the at least one viewer 815 is determined based on the audience images. In one embodiment, processor 201 determines the locations of a plurality of eyes 821 and 822.

In operation 833, in one embodiment, the incidental angles of the plurality of eyes 821 and 822 are determined. In an embodiment, processor 801 can determine the incidental angles of a plurality of eyes 821 and 822 relative to a component of image source 800.

In operation 834, in one embodiment, at least one distortion correction filter 814 is selected from a plurality of distortion correction filters 814 based on the incidental angles of the plurality of eyes 821 and 822. In an embodiment, based on the angles in which lines of sight 823 and 824 hit a component of image source 800, a filter 814 may be chosen to blend with an image in order to prevent images meant for one eye 821 and 822 to be seen by the other eye 821 and 822 of a viewer 815 (i.e., preemptively correct distortion). In one embodiment, a combination of filters 814 may be employed, in which case the filters 814 may be interpolated linearly or non-linearly.

The invention claimed is:

1. A method for reducing distortion from a stereoscopic image source comprising a parallax barrier layer, said method comprising:
   capturing one or more audience images of more than one viewer with an image capturing device;
   determining, at a processor, locations of a plurality of eyes of said more than one viewer based on said audience images;
   determining incidental angles of said plurality of eyes to achieve determined incidental angles;
   finding an average root mean square of at least one of said incidental angles of said plurality of eyes and said locations of said plurality of eyes to achieve a determined average root mean square; and
   selecting at least one distortion correction filter from a plurality of distortion correction filters based on said determined incidental angles of said plurality of eyes and said determined average root mean square.

2. The method of claim 1, further comprising:
   rendering display images in a buffer for said image source with a processor of said at least one processor, wherein said display images are rendered for a right eye and a left eye.

3. The method of claim 2, wherein said at least one processor is selected from the group consisting of central processing units and graphics processing units.

4. The method of claim 2, wherein said rendering is performed using an interface that rests upon an OpenGL interface.

5. The method of claim 1, further comprising:
   processing said display images for said image source with a blend function.

6. The method of claim 1, wherein said incidental angles of said plurality of eyes are determined relative to a component of said image source.

7. The method of claim 6, wherein said component is selected from the group consisting of liquid crystal displays, parallax barriers, light sources, and image capturing devices.

8. The method of claim 1, wherein said distortion correction filter is selected based in part on a transfer function.

9. The method of claim 1, wherein a subset of said plurality of said distortion correction filters are selected and interpolated based on said incidental angles of said plurality of eyes and said average root mean square.

10. The method of claim 9, wherein said subset of said plurality of said distortion correction filters are interpolated non-linearly.

11. A device for reducing distortion from a stereoscopic image source comprising:
   a display picture element layer;
   an image capturing device operable to capture one or more audience images of more than one viewer;
   a parallax barrier layer to show a stereoscopic display image, wherein said parallax barrier layer comprises:
      one or more openings for allowing each eye of a plurality of eyes of said more than one viewer to see a different display image, thereby creating a sense of depth for said plurality of eyes;
   at least one processor, wherein said at least one processor is operable to: determine locations of said plurality of eyes of said more than one viewer based on said audience images, determine incidental angles of said plurality of eyes, find an average root mean square of at least one of said incidental angles of said plurality of eyes and said locations of said plurality of eyes, and select a distortion correction filter based on said incidental angles of said plurality of eyes and said average root mean square; and a plurality of distortion correction filters, wherein said plurality of distortion correction filters are operable to reduce said distortion.

12. The device of claim 11, wherein said at least one processor is operable to render display images in a buffer for a right eye and a left eye.

13. The device of claim 11, wherein said at least one processor is operable to process said display images for said image source with a blend function.

14. The device of claim 11, wherein said incidental angles of said plurality of eyes are determined relative to a component of said device.

15. The device of claim 14, wherein said component is selected from the group consisting of liquid crystal displays, parallax barriers, light sources, and image capturing devices.

16. The device of claim 11, wherein said at least one processor selects said distortion correction filter based in part on a transfer function.

17. The device of claim 11, wherein said at least one processor is selected from the group consisting of central processing units and graphics processing units.

18. The device of claim 11, wherein rendering performed by said at least one processor is performed using an interface that rests upon an OpenGL ES interface.

19. The device of claim 11, wherein a subset of said plurality of said distortion correction filters are selected and interpolated based on said incidental angles of said plurality of eyes and said average root mean square.

20. The device of claim 19, wherein said subset of said plurality of said distortion correction filters is interpolated non-linearly.

* * * * *